United States Patent [19]
Sturman et al.

[11] Patent Number: 6,012,644
[45] Date of Patent: *Jan. 11, 2000

[54] FUEL INJECTOR AND METHOD USING TWO, TWO-WAY VALVE CONTROL VALVES

[75] Inventors: Oded E. Sturman, Newbury Park, Calif.; Steven Massey, Woodland Park, Colo.

[73] Assignee: Sturman Industries, Inc., Woodland Park, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,093

[22] Filed: Apr. 15, 1997

[51] Int. Cl.[7] ................................ F02M 41/02
[52] U.S. Cl. ........................ 239/96; 239/88; 239/90
[58] Field of Search ........................ 239/88, 96, 92, 239/90, 89, 124, 533.8; 251/119.1, 30.1

[56] References Cited

U.S. PATENT DOCUMENTS

| | | |
|---|---|---|
| Re. 35,303 | 7/1996 | Miller et al. . |
| 4,605,166 | 8/1986 | Kelly ........................ 239/96 |
| 4,856,713 | 8/1989 | Burnett . |
| 5,143,291 | 9/1992 | Grinsteiner ........................ 239/88 |
| 5,429,309 | 7/1995 | Stockner ........................ 239/533.8 |
| 5,460,329 | 10/1995 | Sturman ........................ 239/96 |
| 5,597,118 | 1/1997 | Carter, Jr. et al. ........................ 239/92 |
| 5,673,669 | 10/1997 | Maley et al. ........................ 123/446 |
| 5,697,342 | 12/1997 | Anderson et al. ........................ 123/446 |

OTHER PUBLICATIONS

Patent Abstracts of Japan vol. 012, No. 078 (M–675), Mar. 11, 1988 & JP 62 218638 A (Honda Motors Co Ltd), Sep. 26, 1987, see abstract.
Patent Abstracts of Japan vo. 096, No. 012, Dec. 26, 1996 & JP 08 218967 A (Nippondedso Co Ltd), 27 see sbstract.

*Primary Examiner*—Andres Kashnikow
*Assistant Examiner*—David Deal
*Attorney, Agent, or Firm*—Blakely Sokoloff Taylor & Zafman

[57] ABSTRACT

A fuel injector that contains no springs and is controlled by a valve assembly that has more than two modes of operation. The fuel injector includes a housing which has a supply port, a drain port and a cylinder passage that is in fluid communication with an intensifier. The intensifier moves between a first position and a second position within a fuel chamber. The fuel chamber is coupled to a fuel port. Movement of the intensifier into the second position pressurizes the fuel within the fuel chamber. The pressurized fuel opens a needle valve so that fuel is ejected through an aperture of the housing. The cylinder passage is coupled to a first fluid control valve and a second fluid control valve. Each control valve can be actuated between a closed position and an open position. When the first control valve is moved to the open position the supply port is in fluid communication with the cylinder passage so that a fluid flows through the passage to push the intensifier to the second position and eject fuel from the ejector. When the second control valve is actuated to the open position the cylinder passage is coupled to the drain port. The intensifier is coupled to a supply line that provides fluid to move the intensifier back to the first position. The needle valve is also coupled to the return line to move the needle back to a closed position.

28 Claims, 6 Drawing Sheets

FUEL INJECTOR AND METHOD USING TWO, TWO-WAY VALVE CONTROL VALVES

BACKGROUND OF THE INVENTION

1. Field of the Invention

The present invention relates to a fuel injector for an internal combustion engine.

2. Description of Related Art

Figure 1:
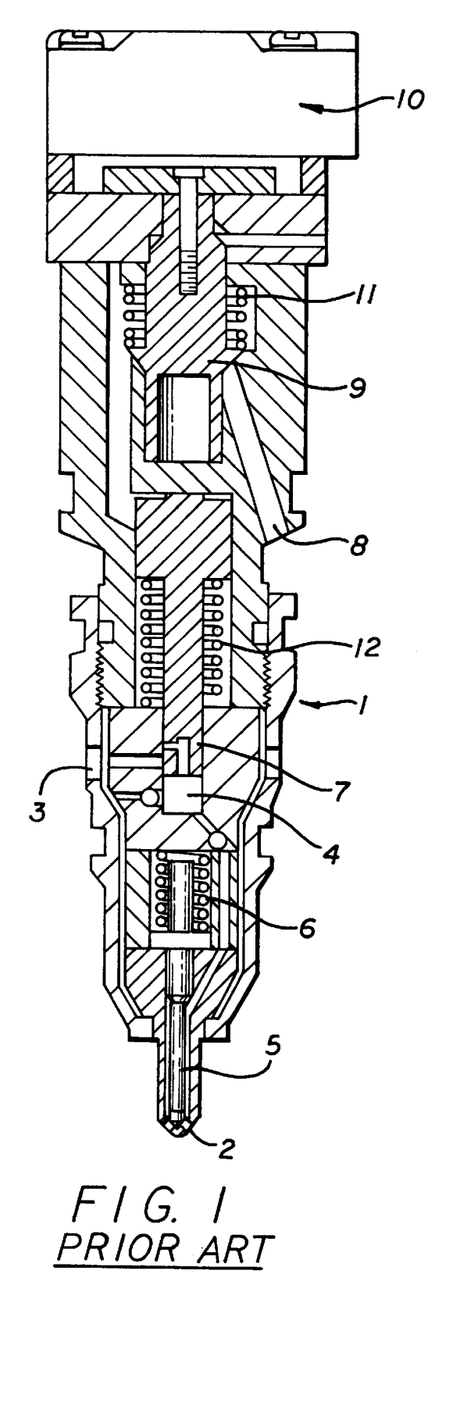
FIG. 1 is a cross-sectional view of a fuel injector of the prior art.

Fuel injectors eject pressurized fuel into the combustion chamber of an internal combustion engine. FIG. 1 shows a fuel injection system 1 of the prior art. The injection system includes a nozzle 2 that is coupled to a fuel port 3 through an intensifier chamber 4. Flow through the nozzle 2 is controlled by a needle valve 5 that is biased into a closed position by a spring 6. The injector 1 contains an intensifier piston 7 that increases the pressure of the fuel in the chamber 4. The pressurized fuel lifts the needle valve 5 to allow injection of fuel into the combustion chamber of an engine.

Figure 2:
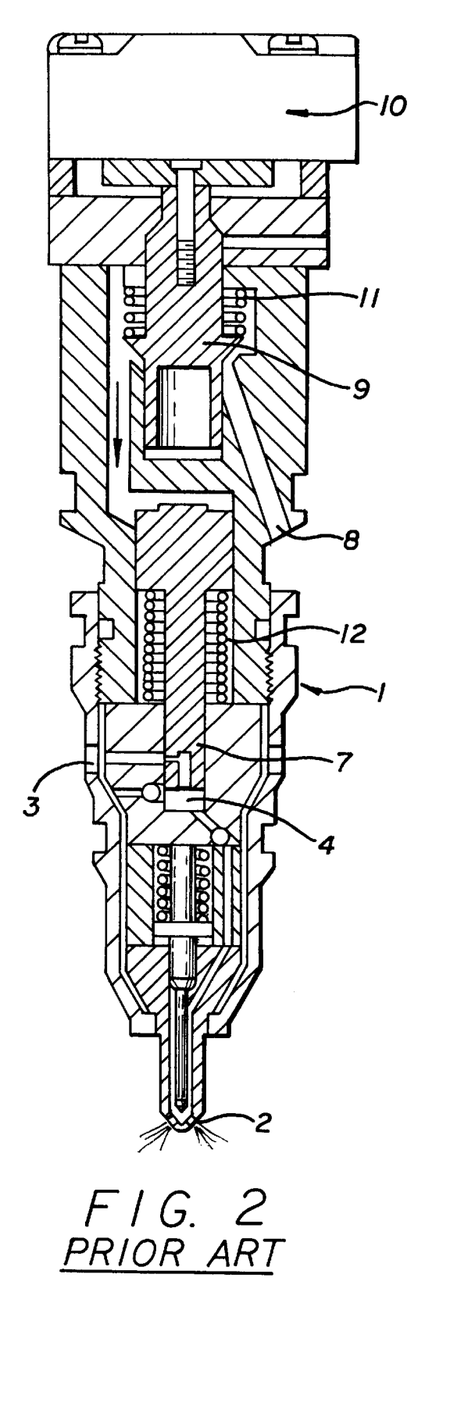
FIG. 2 is a cross-sectional view of the prior art fuel injector ejecting fuel.

The intensifier piston 7 is hydraulically driven by a working fluid that flows through port 8 and controlled by a poppet valve 9. The poppet valve 9 is coupled to a actuator 10 that can be energized to pull the valve 9 into an open position. As shown in FIG. 2, when the actuator 10 opens the poppet valve 9, the working fluid flows through the port 8 and applies a pressure to the intensifier piston 7. The pressure of the working fluid moves the piston 7 and pressurizes the fuel. When the actuator 10 is de-energized, springs 11 and 12 return the poppet valve 9 and the intensifier piston 7 back to the original positions, respectively.

Spring return fuel injectors are relatively slow because of the response time of the return springs. Additionally, the springs generate an additional force which must be overcome by the actuator. Consequently the actuator must be provided with enough current to overcome the spring force and the inertia of the valve. Higher currents generate additional heat and degrade the life and performance of the actuator. Furthermore, the spring rate of the springs may change because of creep and fatigue. The change in spring rate will create varying results over the life of the injector. It would therefore be desirable to provide a fuel injector that contains no springs.

U.S. Pat. No. 5,460,329 issued to Sturman discloses an hydraulically driven fuel injector. The Sturman injector includes a actuator actuated fluid control valve which controls a flow of hydraulic fluid that drives an intensifier of the injector. In one position the fluid control valve allows the hydraulic fluid to flow into the intensifier. The flow of hydraulic fluid drives the intensifier and ejects fuel from the injector. When the control valve is actuated into a second position the intensifier moves back to the original position and drains fuel into the injector.

The fluid control valve of the Sturman injector is either a single three-way valve or a single four-way valve. The control valve is actuated between two positions. In one position the control valve allows the hydraulic fluid to flow from a supply port into a cylinder passage to drive the intensifier. In the other position the control valve couples the cylinder passage to a drain line so that the intensifier moves back to the original position. The control valve therefore has only two modes of operation, driving the intensifier and returning the intensifier. It would be desirable to provide a valve assembly for a hydraulically driven injector that has more than two modes.

For example, the hydraulic fluid for hydraulically driven fuel injectors is typically provided by a pump and a series of fluid lines. The fluid system typically contains a spring biased pressure relief valve which opens to insure that the fluid pressure does not exceed a certain level. The pump must perform work to overcome the spring of the relief valve during the by-pass mode of the system. It would be desirable if the valve assembly of the injector could also provide a by-pass function for the hydraulic system.

Additionally, the fluid control valves are actuated to either drive the intensifier to eject fuel, or return the intensifier to draw more fuel into the fuel chamber of the injector. It may be desirable to maintain the position of the intensifier at an intermediate position to more accurately control the amount and rate of fuel injection. None of the valve assemblies of the prior art allow an intensifier to be held in an intermediate position.

SUMMARY OF THE INVENTION

The present invention is a fuel injector that contains no springs and is controlled by a valve assembly that has more than two modes of operation. The fuel injector includes a housing which has a supply port, a drain port and a cylinder passage that is in fluid communication with an intensifier. The intensifier moves between a first position and a second position within a fuel chamber. The fuel chamber is coupled to a fuel port. Movement of the intensifier into the second position pressurizes the fluid within the fuel chamber. The pressurized fuel opens a needle valve so that fuel is ejected through an aperture of the housing.

The cylinder passage is coupled to a first fluid control valve and a second fluid control valve. Each control valve can be actuated between a closed position and an open position. When the first control valve is moved to the open position the supply port is in fluid communication with the cylinder passage so that a fluid flows through the passage to push the intensifier to the second position and eject fuel from the ejector. When the second control valve is actuated to the open position the cylinder passage is coupled to the drain port. The intensifier is coupled to a supply line that provides pressurized fluid which moves the intensifier back to the first position. The needle valve is also coupled to the supply line to move the needle back to a closed position. The supply line eliminates the need for any return springs in the valve. The injector may have additional modes wherein both control valves are simultaneously moved to the open position to provide fluid communication between the supply port and the drain port to by-pass the fluid system. Additionally, the control valves may be moved to the closed positions so that no fluid flows to or from the cylinder passage to hold the intensifier in an intermediate position.

DETAILED DESCRIPTION OF THE INVENTION

Figure 3:
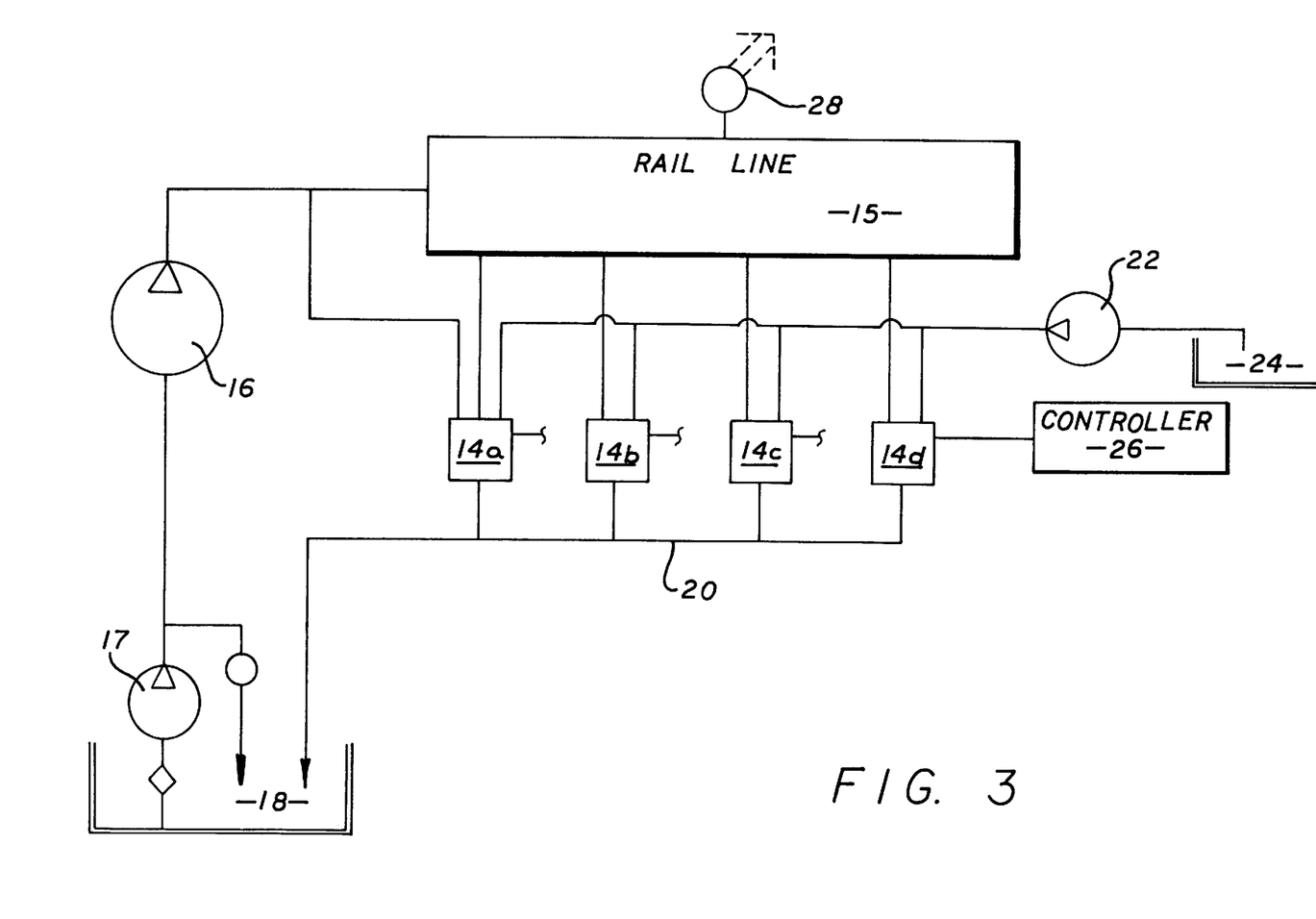
FIG. 3 is a schematic of a fuel injector system for an internal combustion engine.

Referring to the drawings more particularly by reference numbers, FIG. 3 shows a plurality of fuel injectors 14a–d within a fuel injection system. The fuel injectors 14a–d are hydraulically driven devices used to inject a fuel into the combustion chambers (not shown) of an internal combustion engine. The fuel injectors are attached to a rail line 15 that is coupled to the output port of a high pressure pump 16. The input port of the high pressure pump 14 may be connected to the output port of low pressure pump 17. The input port of the low pressure pump 17 is connected to a reservoir of hydraulic fluid 18. The fuel injectors 14a–d are connected to the reservoir 18 through a drain line 20. The fuel injectors 10 are also connected to a fuel pump 22 and a reservoir of engine fuel 24. Although a separate hydraulic system is shown and described, it is to be understood that the injectors can be driven by the fuel of the engine.

The fuel injectors 14a–d are connected to an electronic controller 26. The controller 26 may contain a microprocessor and associated memory, logic and driver circuitry that control the actuation of the fuel injectors. The controller 26 may also be connected to a pressure sensor 28 in the rail line 12 of the hydraulic system. Although a separate hydraulic fluid is shown and described, it is to be understood that the injectors 14a–d may be actuated by the fuel, instead of the hydraulic fluid.

Figure 4:
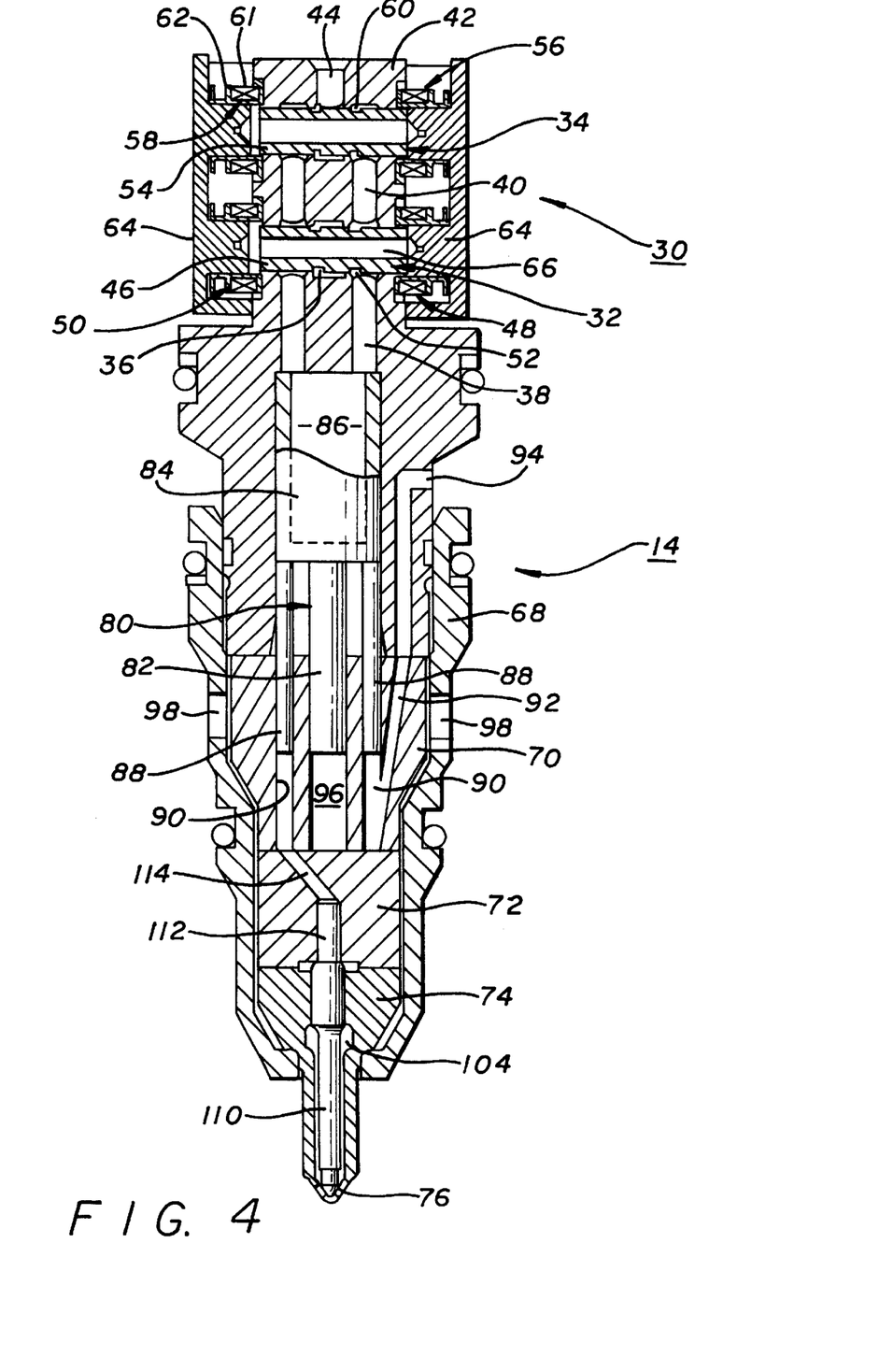
FIG. 4 is a cross-sectional view of a fuel injector of the present invention.
Figure 5:
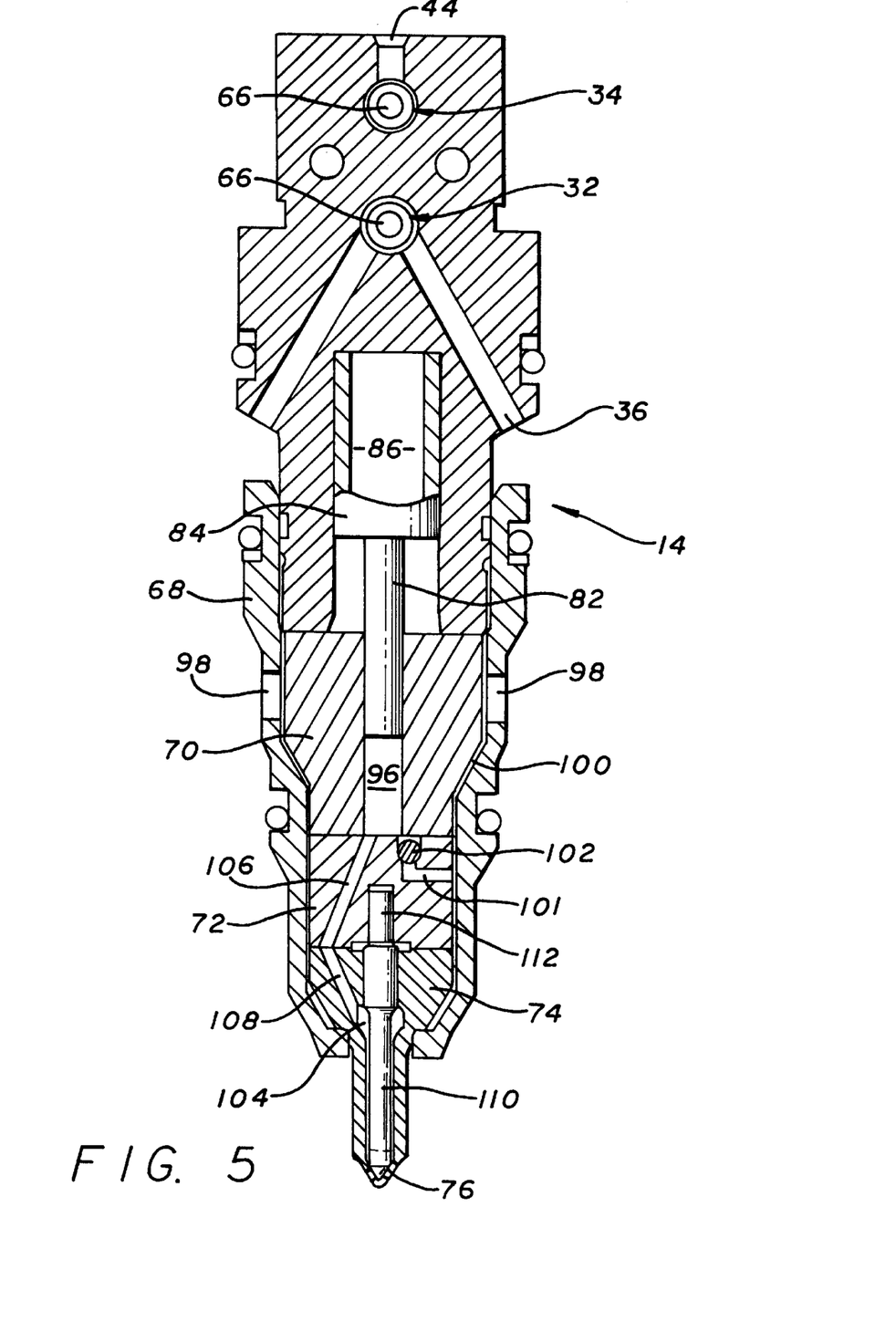
FIG. 5 is a cross-sectional view of the fuel injector.

FIGS. 4 and 5 show a preferred embodiment of a fuel injector 14. The fuel injector 14 includes a valve assembly 30 which has a first fluid control valve 32 and a second fluid control valve 34. The first control valve 32 is connected to a pair of first supply ports 36, a pair of cylinder passages 38 and a pair of common passages 40 located within a top housing block 42. The second control valve 34 is connected to the common passages 40 and a drain port 44 in the top block 42. The cylinder passages 38 are always in fluid communication with the common passages 40. The supply port 36 is connected to the rail line 15 and the drain port 44 is connected to the drain line 20 of the hydraulic system shown in FIG. 3.

The first control valve 32 has a first spool 46 that is moved into a closed position by a first actuator 48 and into an open position by a second actuator 50. When in the open position the spool 46 has annular grooves 52 that provide fluid communication between the supply port 36 and the cylinders passages 38. In the closed position the first spool 46 prevents fluid communication between the port 36 and the passages 38.

The second control valve 34 has a second spool 54 that is moved into a closed position by a first actuator 56 and an open position by a second actuator 58. When in the open position the spool 54 has annular grooves 60 that provide fluid communication between the common passages 40 and the drain port 44. In the closed position the second spool 54 prevents fluid communication between the passages 40 and the port 44.

The actuators 48, 50, 56 and 58 each contain a coil 61 that is wound about a bobbin 62. The actuators 48, 50, 56 and 58 are captured by end plates 64 that are attached to the top block 42. The injector has two cylinder passages 38 and two common passages 40 so that the fluid flows across the spool in equal and opposite directions. The opposing fluid flow provide offsetting fluid forces on the spool which dynamically balance the valve. The spools 46 and 54 may each have a center channel 66 which prevents a hydrostatic build up of fluid which leaks into the ends of the spools.

In the preferred embodiment the spools 46 and 54 and end plates 64 are constructed from a magnetic steel such as 52100. The top block 42 may also be constructed from a magnetic steel material. After a actuator is energized, the magnetic steel retains enough magnetism to provide a magnetic force which holds the spool in position even when power to the actuators is terminated. The valve can therefore be switched with a short digital pulse that is provided to one of the actuators 48, 50, 56 or 58 by the electronic controller 26.

The top block 42 is attached to an outer shell 68. The outer shell 68 contains an intensifier block 70, a passage block 72 and a needle housing 74. The needle housing 74 has a plurality of apertures 76 that allow fuel to be ejected from the fuel injector 14. The blocks and shell can generally be referred to as an injector housing.

The fuel injector 18 includes an intensifier 80 which has an intensifier piston 82 and an intensifier head 84. The head 84 has a cavity 86 that is connected to the cylinder passages 38. The intensifier 80 is coupled to a pair of return pins 88 located within a pair of corresponding channels 90 in block 72. The channels 90 are connected to a supply line 92 that is in fluid communication with a second supply port 94. The second supply port 94 is connected to the rail line 12. The area of the intensifier head 84 is larger than the return pins 88 so that the intensifier 80 moves in a downward direction when pressurized fluid flows into the cavity 86. The return pins 88 move the intensifier 80 back to the original position when the cylinder passage 38 and cavity 86 are connected to the drain port 44.

The intensifier piston 82 moves within a fuel chamber 96 located in block 72. The fuel chamber 96 is coupled to a pair of fuel ports 98 by passages 100 and 101, and a one-way check valve 102. The fuel chamber 96 is also connected to a needle chamber 104 by passages 106 and 108 in blocks 74 and 76, respectively. The needle chamber 104 contains a needle valve 110. The needle valve 110 is biased into a closed position by a pin 112. The pin 112 is in fluid communication with a passage 114 that is connected to the channels 90 and pressurized hydraulic fluid.

Figure 6:
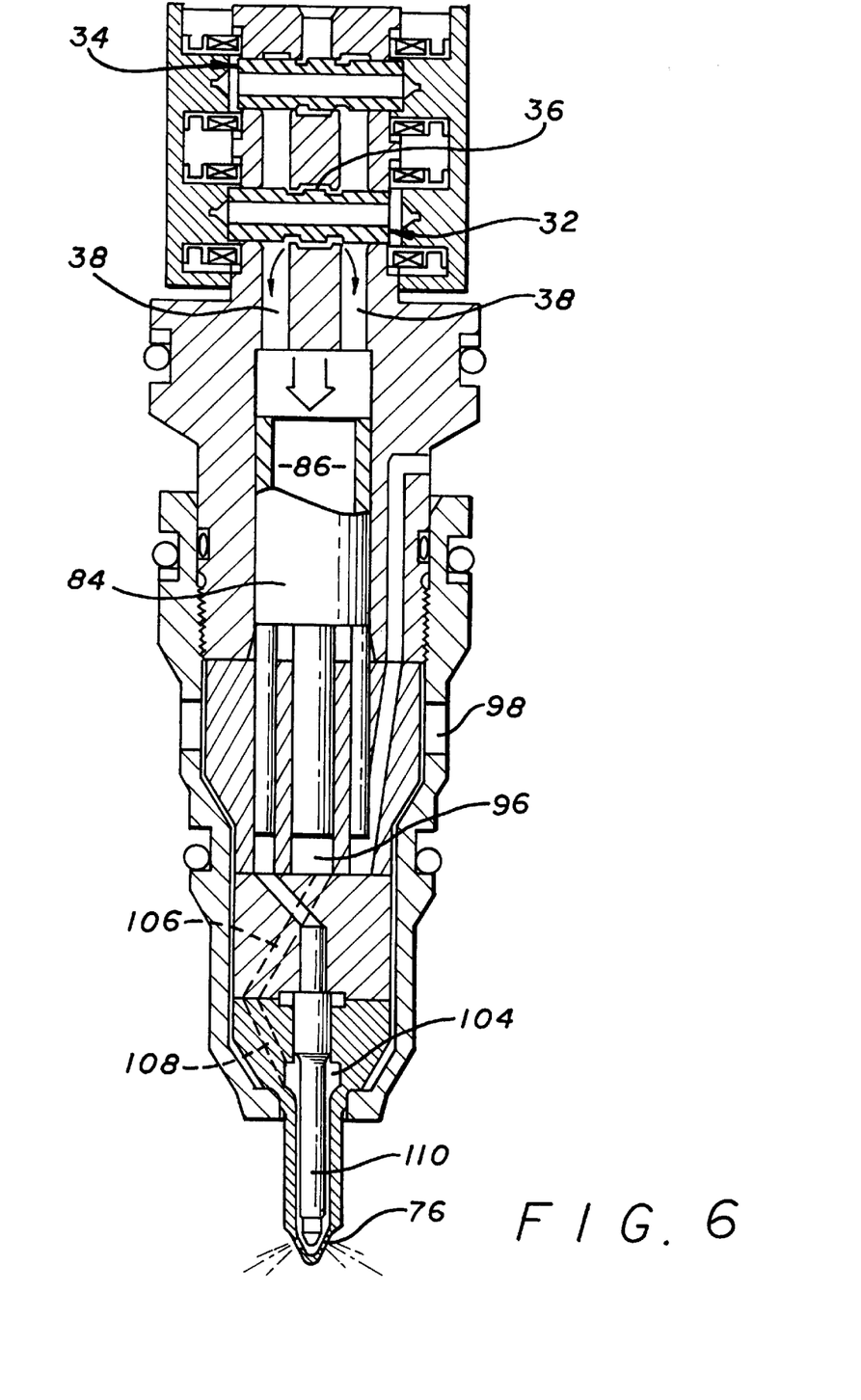
FIG. 6 is a cross-sectional view showing fuel being ejected from the fuel injector.

As shown in FIG. 6 when the first valve 32 is switched to the open position and the second valve 34 is maintained in the closed position, pressurized fluid flows through the cylinder passages 38 and into the cavity 86 of the intensifier head 84 from the first supply port 36. The hydraulic fluid moves the intensifier 80 and pushes fuel within the fuel chamber 96 into the needle chamber 104. The check valve 102 prevents the fuel from flowing back through the fuel ports 98. The pressure of the fuel lifts the needle valve 110 into an open position allowing fuel to be ejected through the apertures 76.

Figure 7:
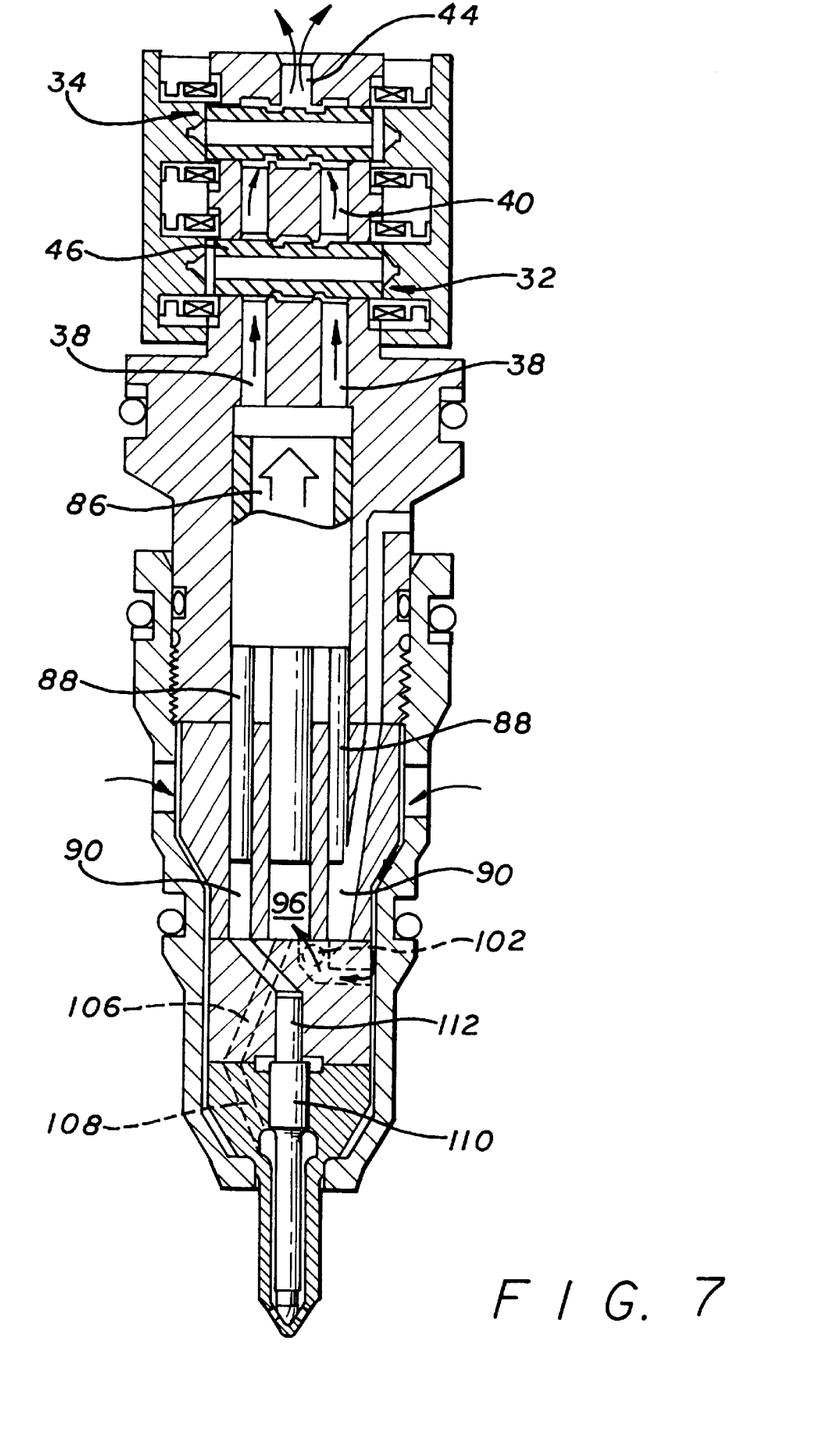
FIG. 7 is a cross-sectional view showing the injector drawing in fuel.

As shown in FIG. 7, the first valve 32 is closed and the second valve 34 is opened to couple the drain port 44 to the cylinders passages 38. The fluid flows around the spool 46 of the first valve 32 from the cylinder passages 38 to the common passages 40. The cavity 86 is reduced to the lower drain pressure. The pressurized fluid within the supply channel 92 exerts a pressure on the return pins 88 and pushes the intensifier 80 in an upward direction. The movement of the intensifier piston 82 draws more fuel into the fuel chamber 96. The pin 112 pushes the needle valve 110 back to the closed position, wherein the process can be repeated.

During the downward stroke of the intensifier 80, between the first and second positions the controller 26 may actuate the first valve 32 so that the first and second valves 32 and 34 are in the closed positions. In the closed position no fluid can flow into or out of the cylinder passages 38, thereby fixing the position of the intensifier 80 in an intermediate position. Likewise, when the first valve 32 is closed and the second valve 34 is open to move the intensifier 80 and draw in fuel, the second valve 34 can be closed to hold the position of the intensifier 80. The controller 26 can utilize this mode to vary the amount of fuel ejected from the fuel injector. Additionally, the controller 26 can more accurately control the fuel curve created by the fuel injector.

Between fuel injection cycles the controller 26 may actuate both the first valve 32 and the second valve 34 to the open positions so that the hydraulic fluid flows from the supply port 36 to the drain port 44. In this manner the valve assembly 30 of the fuel injector 10 functions as a by-pass valve. The controller 26 can analyze feedback signals from the pressure sensor 28 and lower the rail pressure by placing a injector 14 in the by-pass mode. The fuel injector can therefore provide the dual functions of a fuel injector and a by-pass valve for the hydraulic system.

The valves 32 can be actuated into one of four modes. In the first mode the first valve 32 is open and the second valve 34 is closed so that the hydraulic fluid drives the intensifier 80 and fuel is ejected from the injector. In the second mode the first valve 32 is closed and the second valve 34 is open to return the intensifier 80 and draw fuel into the injector. In the third mode the valves 32 and 34 are closed to hold the intensifier 80 in an intermediate position. In the fourth mode the first 32 and second 34 valves are open so that the injector functions as a by-pass valve.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A fuel injector that ejects a fuel, comprising:
    a housing that has a first supply port, a drain port and a cylinder passage;
    an intensifier that is coupled to said cylinder passage, said intensifier can move from a first position to a second position to eject a fuel;
    a first fluid control valve that can be actuated between a closed position and an open position, wherein said first fluid control valve provides fluid communication between said first supply port and said cylinder passage in said open position, so that said intensifier moves from the first position to the second position; and,
    a second fluid control valve that can be actuated between a closed position and an open position, wherein said second fluid control valve provides fluid communication between said cylinder passage and said drain port through said first control valve when in said open position, so that said intensifier moves from the second position to the first position, said first fluid control valve can provide fluid communication between said first supply port and said cylinder passage without flow through said second fluid control valve.

2. The fuel injector as recited in claim 1, wherein said first and second fluid control valves each include a two-way actuator actuated spool.

3. The fuel injector as recited in claim 2, wherein said spool of each fluid control valve can be maintained in a position by a residual magnetic force.

4. The fuel injector as recited in claim 1, wherein said first fluid control valve is connected to said second fluid control valve by a common package.

5. The fuel injector as recited in claim 1, wherein said housing includes a supply line that is coupled to said intensifier and which provides a fluid that moves said intensifier from the second position to the first position when said second fluid control valve is in the open position.

6. The fuel injector as recited in claim 5, wherein housing has a second supply port that is connected to said supply line.

7. The fuel injector as recited in claim 5, further comprising a pin that is coupled to said supply line and which can push said intensifier from the second position to the first position.

8. The fuel injector as recited in claim 1, wherein said intensifier moves within a fuel chamber that is coupled to a fuel port and an aperture in said housing.

9. The fuel injector as recited in claim 8, further comprising a needle valve that moves between a closed position and an open position so that the fuel is ejected from said fuel chamber and through said aperture when said intensifier is in the second position and said needle valve is in the open position.

10. The fuel injector as recited in claim 9, wherein said needle valve is coupled to said supply line such that the fluid moves said needle valve from the open position to the closed position when said intensifier moves from the second position to said first position.

11. A fuel injector that ejects a fuel and is actuated by a fluid, comprising:
    a housing that has a first supply port, a drain port, a cylinder passage, a fuel chamber that is coupled to a fuel port and an aperture, and a supply line that is coupled to a second supply port, wherein the fluid flows through said first and second supply ports, and the fuel flows into said fuel chamber from said fuel port;
    a needle valve that can move between a closed position and an open position to control a flow of fuel from said fuel chamber through said aperture;
    an intensifier that is coupled to said cylinder passage and said supply line, said intensifier can move within said fuel chamber from a first position to a second position to eject the fuel from said fuel chamber through said aperture;
    a first fluid control valve that can be actuated between a closed position and an open position, wherein said first fluid control valve provides fluid communication between said first supply port and said cylinder passage in said open position, so that said intensifier moves from the first position to the second position; and,
    a second fluid control valve that can be actuated between a closed position and an open position, wherein said second fluid control valve provides fluid communication between said cylinder passage and said drain port through said first control valve when in said open position, so that said intensifier moves from the second position to the first position, said first fluid control valve can provide fluid communication between said first supply port and said cylinder passage without flow through said second fluid control valve.

12. The fuel injector as recited in claim 11, wherein said first and second fluid control valves each include a two-way actuator actuated spool.

13. The fuel injector as recited in claim 12, wherein said spool of each fluid control valve can be maintained in a position by a residual magnetic force.

14. The fuel injector as recited in claim 11, wherein said first fluid control valve is connected to said second fluid control valve by a common package.

15. The fuel injector as recited in claim 11, further comprising a pin that is coupled to said supply line and which can push said intensifier from the second position to the first position.

16. The fuel injector as recited in claim 11, wherein said needle valve is coupled to said supply line such that the fluid moves said needle valve from the open position to the closed position when said intensifier moves from the second position to said first position.

17. A method for actuating a fuel injector that ejects a fuel, comprising the steps of:

a) providing a fuel injector that includes;
    a housing that has a first supply port, a drain port and a cylinder passage;
    an intensifier that is coupled to said cylinder passage, said intensifier can move from a first position to a second position to eject a fuel;
    a first fluid control valve that can be actuated between a closed position and an open position, wherein said first fluid control valve provides fluid communication between said first supply port and said cylinder passage in said open position, so that said intensifier moves from the first position to the second position, and prevents fluid communication between said supply port and said cylinder passage in the closed position;
    a second fluid control valve that can be actuated between a closed position and an open position, wherein said second fluid control valve provides fluid communication between said cylinder passage and said drain port through said first control valve when in said open position, so that said intensifier moves from the second position to the first position, and prevents fluid communication between said cylinder passage and said drain port in the closed position, said first fluid control valve can provide fluid communication between said first supply pot and said cylinder passage without flow through said second fluid control valve;
  b) actuating said first fluid control valve to the open position to move said intensifier to the second position; and,
  c) actuating said second fluid control valve to the open position and said first fluid control valve to the closed position to move said intensifier to the second position.

18. The method as recited in claim 17, further comprising the step (d) of actuating said first and second control valves to the closed positions.

19. The method as recited in claim 17, further comprising the step (d) of actuating said first fluid control valve to the open position.

20. A fuel injector that ejects a fuel that is controlled by an hydraulic fluid from a source of hydraulic fluid, comprising:

a housing which has a first supply port and a second supply port that are coupled to the source of hydraulic fluid, a drain port, and a cylinder passage;
  an intensifier that is coupled to said cylinder passage and said second supply port, said intensifier can move between a first position and a second position to eject the fuel; and,
  a control valve assembly that can be actuated into a first state wherein said cylinder passage is coupled to said first supply port so that said intensifier moves from the first position to the second position, and a second state wherein said cylinder passage is coupled to said drain port and the hydraulic fluid from said second supply ports exerts an hydraulic pressure to move said intensifier from the second position to the first position.

21. The fuel injector as recited in claim 20, wherein said control valve assembly includes a first fluid control valve that is coupled to said first supply port and said cylinder passage and a second fluid control valve that is coupled to said drain port and said cylinder passage.

22. The fuel injector as recited in claim 21, wherein said first and second fluid control valves each include a two-way actuated spool.

23. The fuel injector as recited in claim 22, wherein said spool of each fluid control valve is maintained in a position by a residual magnetic force.

24. The fuel injector as recited in claim 21, wherein said first fluid control valve is connected to said second fluid control valve by a common package.

25. The fuel injector as recited in claim 20, further comprising a pin that is coupled to said intensifier and said second supply port.

26. The fuel injector as recited in claim 20, wherein said intensifier moves within a fuel chamber that is coupled to a fuel port and an aperture in said housing.

27. The fuel injector as recited in claim 26, further comprising a needle valve that can move between a closed position and an open position so that the fuel is ejected from said fuel chamber and through said aperture when said intensifier is in the second position and said needle valve is in the open position.

28. The fuel injector as recited in claim 27, wherein said needle valve is coupled to said supply line such that the fluid moves said needle valve from the open position to the closed position when said intensifier moves from the second position to said first position.

* * * * *

UNITED STATES PATENT AND TRADEMARK OFFICE
CERTIFICATE OF CORRECTION

PATENT NO. : 6,012,644
DATED : January 11, 2000
INVENTOR(S) : Oded E. Struman; Steven Massey It is certified that error appears in the above-identified patent and that said Letters Patent is hereby corrected as shown below:

Title page,
ABSTRACT,
Line 22, replace "return" with -- supply --

Column 2,
Line 39, following "needle" add -- valve --

Column 7, claim 17,
Line 35, replace "pot" with -- port --

Column 8, claim 28,
Line 44, replace "supply line" with -- source of hydraulic fluid --

Signed and Sealed this

Fifth Day of February, 2002

Attest:

Attesting Officer

JAMES E. ROGAN
*Director of the United States Patent and Trademark Office*